United States Patent [19]

Ceste, Sr. et al.

[11] Patent Number: 4,740,888
[45] Date of Patent: Apr. 26, 1988

[54] CONTROL SYSTEM FOR COOKING APPARATUS

[75] Inventors: Mario G. Ceste, Sr., Stratford; Gerald F. Waugh, Orange, both of Conn.

[73] Assignee: Food Automation-Service Techniques, Inc., Stratford, Conn.

[21] Appl. No.: 934,700

[22] Filed: Nov. 25, 1986

[51] Int. Cl.<sup>4</sup> .............................................. G05B 9/02
[52] U.S. Cl. ............................. 364/187; 364/400; 364/477; 364/557; 364/569; 219/494; 219/501
[58] Field of Search ............... 364/187, 400, 557, 149, 364/477, 569; 219/494, 497, 501, 492

[56] References Cited

U.S. PATENT DOCUMENTS

| | | | |
|---|---|---|---|
| 3,982,098 | 9/1976 | Trostler | 219/501 |
| 4,091,266 | 5/1978 | Ito et al. | 219/501 |
| 4,390,965 | 6/1983 | Albert | 364/400 |
| 4,638,135 | 1/1987 | Aoki | 219/497 |
| 4,674,027 | 6/1987 | Beckey | 364/557 |

Primary Examiner—Michael R. Fleming
Assistant Examiner—Steve Long Hoang
Attorney, Agent, or Firm—Felfe & Lynch

[57] ABSTRACT

A control system for cooking apparatus including a heat source, a heat control system and a back-up thermostat system having a back-up temperature probe. The control system includes a digitally controlled microcomputer which provides control transfer from a cooking computer temperature probe upon probe failure or shorting of a control transfer relay or a microprocessor software failure to a back-up temperature controller.

7 Claims, 5 Drawing Sheets

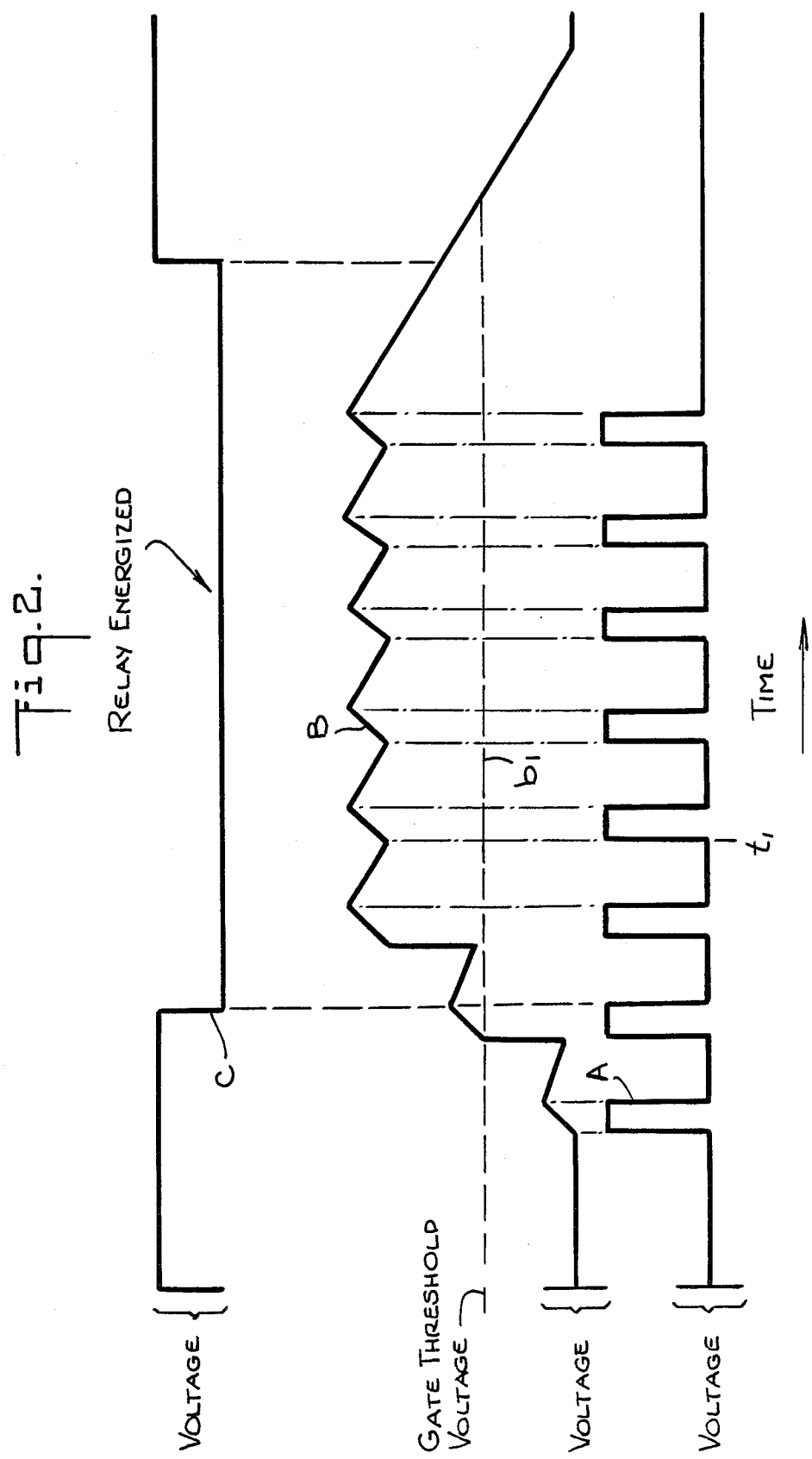

CONTROL SYSTEM FOR COOKING APPARATUS

BACKGROUND OF THE INVENTION

This invention relates to a control system for cooking apparatus including a heat source, heat control means, and back-up thermostat means having a back-up temperature probe. More particularly, the invention relates to cooking apparatus controlled by a programmed digital computer and by an analog circuit or by a second programmed digital microcomputer. The control system is suitable for use as a control system for commercial cooking apparatus utilizing, for example, a cooking medium such as cooking oil or shortening for frying one or more food products.

U.S. Pat. No. 4,320,285-Koether relates to a primary thermostat using a cooking computer temperature probe with control transfer upon probe failure. However, there are conditions when control transfer to the back-up thermostat should occur besides probe failure in a primary thermostat. For example, if the signal line from the cooking computer to the control transfer relay is shorted or if the primary thermostat has turned the heat output to an "on" condition and thereafter failed, the heat output would stay on and no transfer to the back-up thermostat would occur.

It is an object of the present invention, therefore, to provide a new and improved control system for cooking apparatus which avoids one or more of the limitations of prior such apparatus.

It is another object of the invention to provide a new and improved control system for cooking apparatus which provides control transfer from a cooking computer temperature probe upon probe failure or shorting of a control transfer relay to a back-up temperature controller.

It is another object of the invention to provide a new and improved control system for cooking apparatus, the control system including a digitally controlled microcomputer which provides control transfer from a cooking computer temperature probe upon probe failure or shorting of a control transfer relay or a microprocessor software failure to a back-up temperature controller.

SUMMARY OF THE INVENTION

In accordance with the invention, a control system for cooking apparatus including a heat source, heat control means, back-up thermostat means having a back-up temperature probe, comprises control transfer means and primary thermostat means including a primary temperature probe and coupled through the control transfer means to the heat control means for controlling the temperature of the cooking apparatus. The control system includes means for generating a control transfer signal repetitively during predetermined spaced time intervals in the course of normal operation and responsive to a failure of the primary thermostat means for ceasing to generate the control transfer signal repetitively. The control system also includes means responsive to the repetitive control transfer signal for causing the control transfer means to couple the primary thermostat means to the heat control means for controlling the temperature of the cooking apparatus and responsive to the absence of the control transfer signal during the predetermined spaced time intervals for causing the control transfer means to transfer coupling of the heat control means from the primary thermostat means to the back-up thermostat means for controlling the temperature of the cooking apparatus in the event of a failure of the primary thermostat means.

BRIEF DESCRIPTION OF THE DRAWINGS

Referring now to the drawings:

FIG. 2 is a graph representing certain signals of the FIG. 1 control system;

DESCRIPTION OF THE PREFERRED EMBODIMENT

Figure 4:
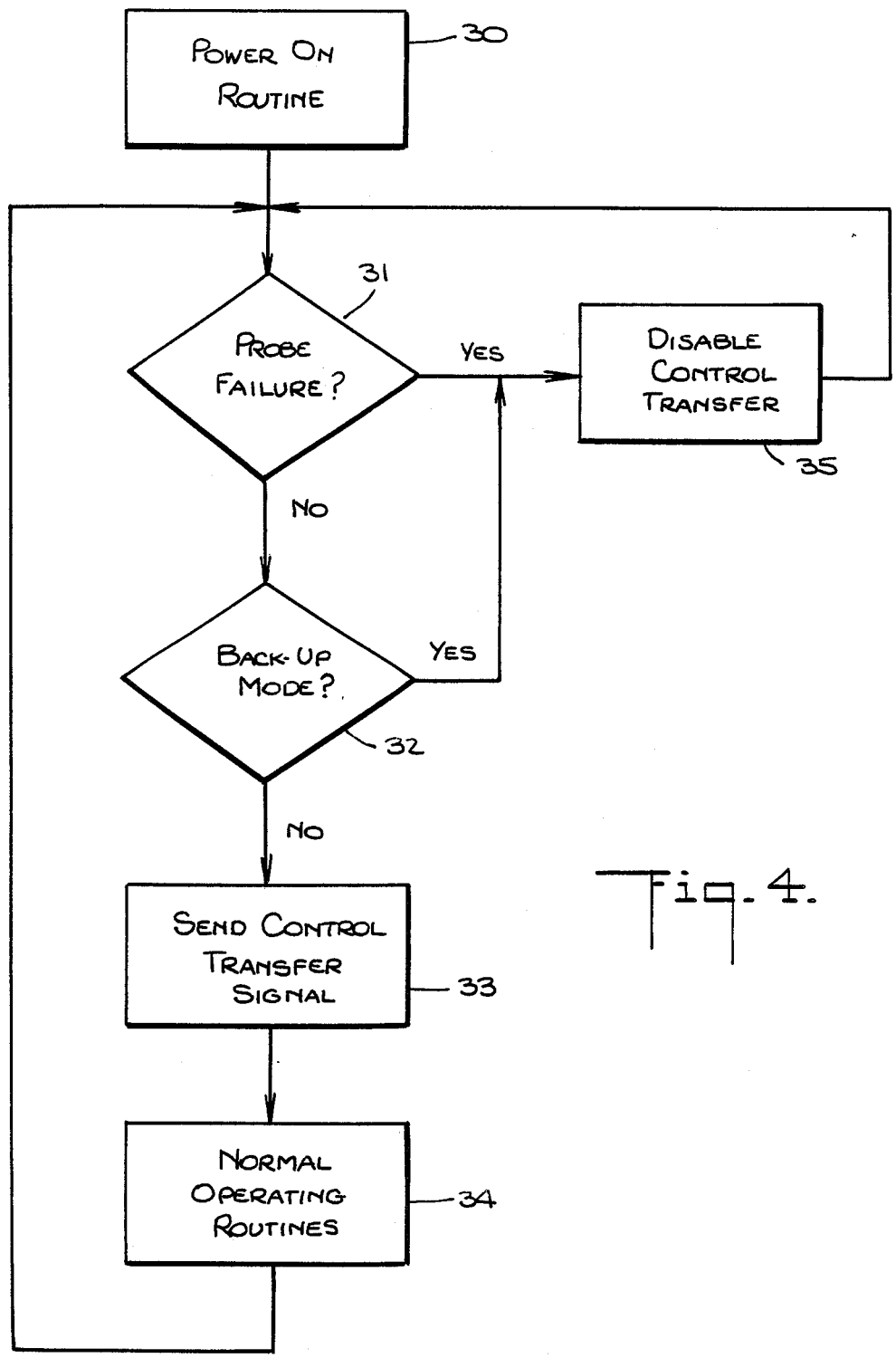
FIG. 4 is a flow chart comprising a representation of a portion of a microcomputer which operates according to a computer program produced according to the flow chart.
Figure 5:
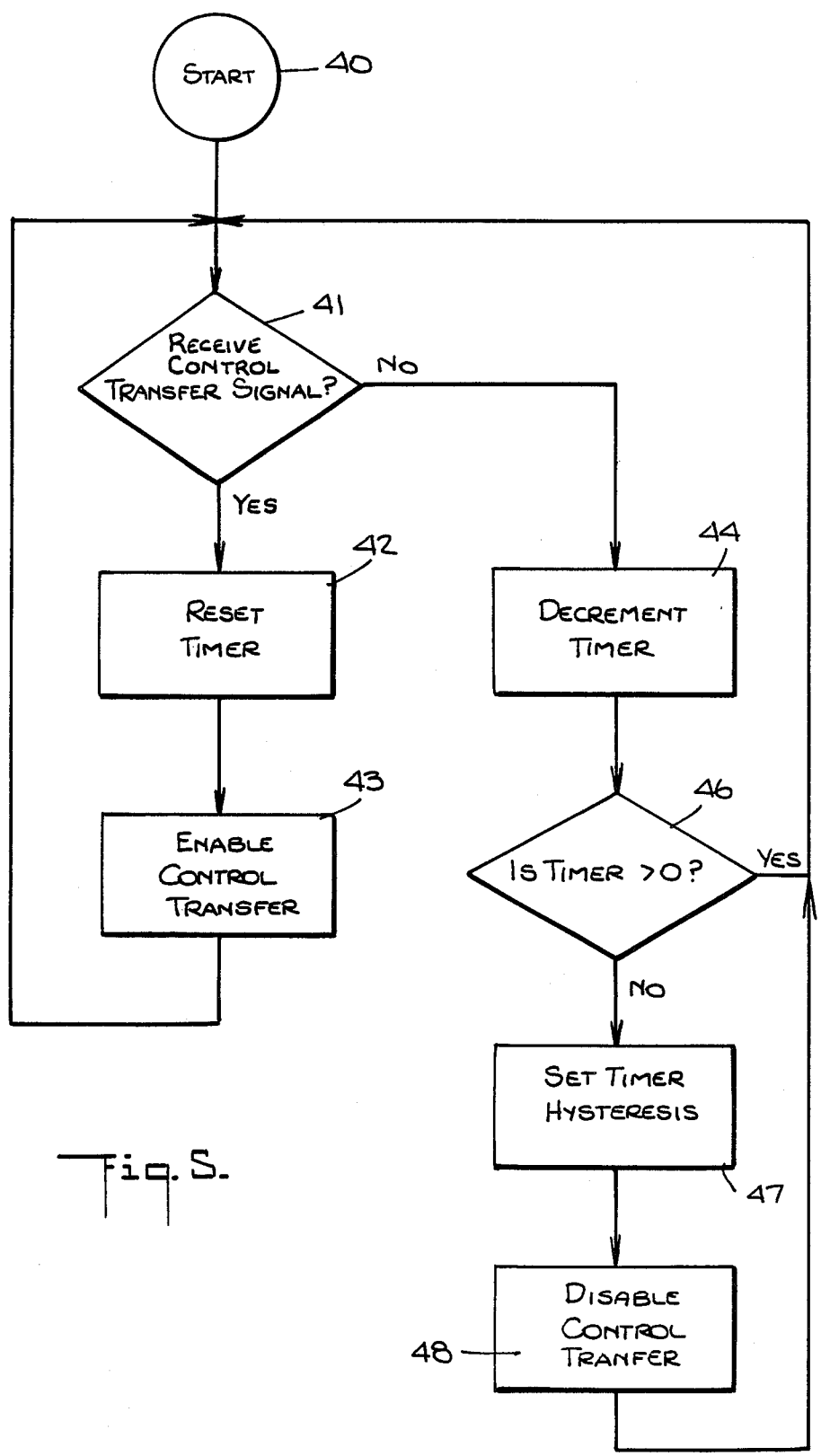
FIG. 5 is a flow chart comprising a representation of a portion of a microcomputer and certain circuits coupled thereto, the microcomputer operating according to a computer program produced according to the flow chart.

Before referring to the drawings in detail it will be understood that for purposes of clarity, the transmitter apparatus represented in block diagram in FIG. 4 and the receiver apparatus represented in block diagram in FIG. 5 each utilizes, for example, an individual analog-to-digital converter and an individual microprocessor which includes such hardware as a central processing unit, program and random access memories, timing and control circuitry, input-output interface devices and other conventional digital subsystems necessary to the operation of the central processing unit as is well understood by those skilled in the art. Each microprocessor operates according to the computer program produced according to the corresponding flow chart represented in the drawings.

Figure 1:
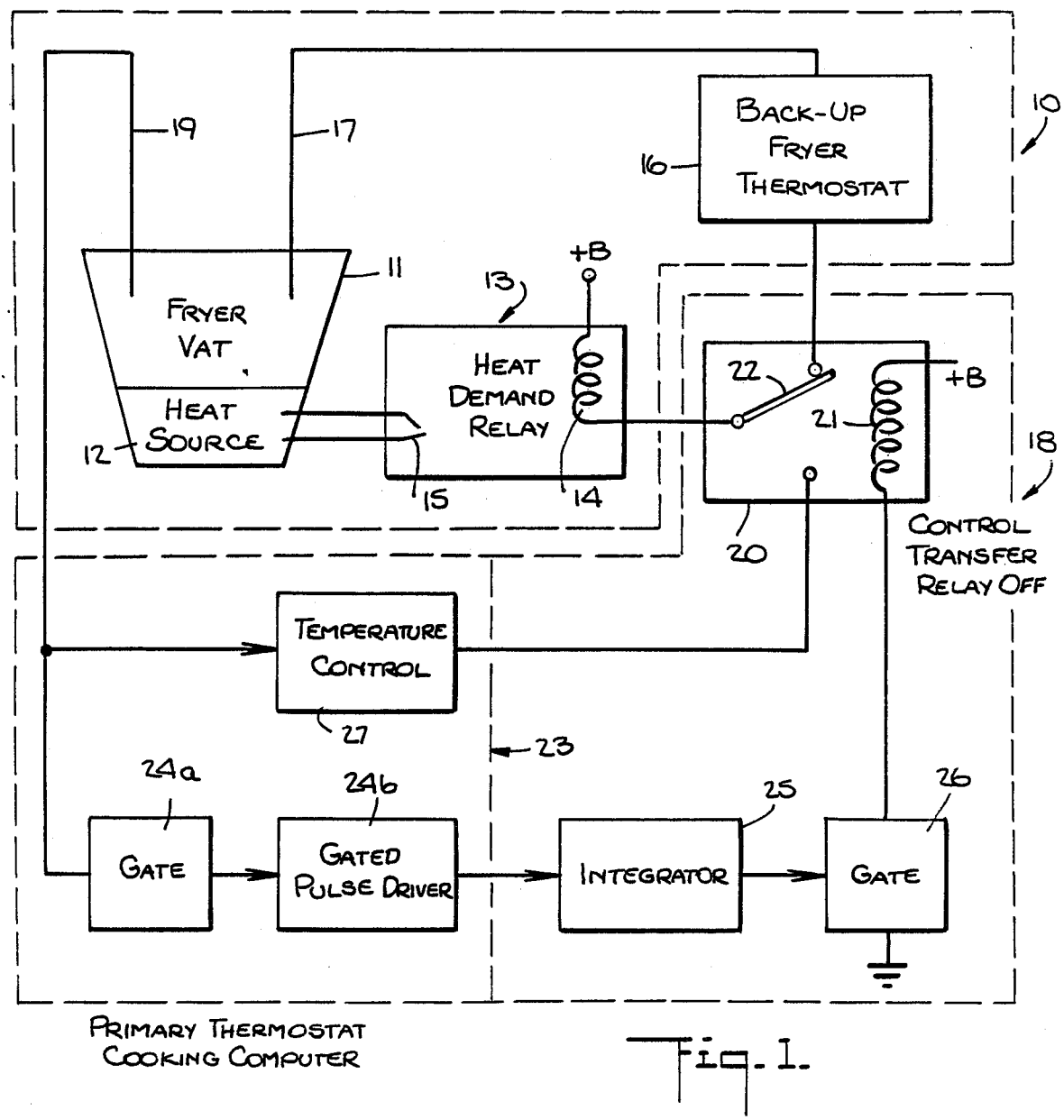
FIG. 1 is a diagrammatic view, partly schematic, of a cooking apparatus including a control system constructed in accordance with the invention.

Referring now more particularly to FIG. 1 of the drawings, there is represented cooking apparatus 10 including, for example, a fryer vat 11 having suitable cooking oil or shortening therein and heated by a heat source 12 under the control of heat control means 13 preferably comprising a suitable heat demand relay having a relay winding 14 and contacts 15 which when closed cause the heat source 12 to be energized. Back-up thermostat means preferably comprising a back-up fryer thermostat 16 has a back-up temperature probe 17 in the fryer vat 11.

A receiver 18 and the heat demand relay 13 preferably are mounted on an interface board at the cooking appliance including the fryer vat 11.

The control system also includes control transfer means 20 and primary thermostat means 23 including a primary temperature probe 19 in the fryer vat 11 and coupled through a temperature control gate 27, of a microcomputer to be described subsequently, in primary thermostat means 23 and through control transfer means 20 to the heat control means 13 for controlling the temperature of the cooking apparatus. The control transfer means includes a control transfer relay winding 21 having contacts 22 coupled to the heat demand relay winding 14.

The control system also includes means for generating a control transfer signal repetitively during predetermined spaced time intervals in the course of normal operation and responsive to a failure of the primary thermostat means for ceasing to generate the control transfer signal repetitively. The means for generating a control transfer signal preferably comprises a transmitter primary thermostat 23 including a microcomputer programmed, for example, in accordance with flow chart described subsequently with reference to FIG. 4. The microcomputer may, for example, include a gate 24a coupled to the temperature probe 19 and having its output coupled to a gated pulse driver 24b which is, in turn, coupled to a receiver integrator 25 having its output coupled to a gate 26 coupled to the control transfer relay winding 21. Means comprising a portion of the programmed microcomputer, the receiver integrator 25, and the gate 26 are responsive to the repetitive control transfer signal for causing the control transfer means 20 to couple the primary thermostat means 23 to the heat control means 13 for controlling the temperature of the cooking apparatus and responsive to the absence of the control transfer signal during the predetermined spaced time intervals for causing the control transfer means 20 to transfer coupling of the heat control means 13 from the primary thermostat means 23 to the back-up thermostat means 16 for controlling the temperature of the cooking apparatus in the event of a failure of the primary thermostat means.

As will be described more fully subsequently, the means 23, 24a, 24b, 25, 26 responsive to the absence of the control transfer signal includes means comprising a programmed microprocessor portion for determining when a failure occurs in the primary thermostat means 23 for causing the control transfer means 20 to transfer coupling of the heat control means 13 from the primary thermostat means 18 to the back-up thermostat means 16, 17. The means for determining when a failure occurs in the primary thermostat means includes a programmed portion of the microcomputer including gate 24a and gate 24b and receiver integrator 25 and gate 26 for causing the control transfer means 20 to transfer coupling of the heat control means 13 from the primary thermostat means 23 to the back-up thermostat means 16, 17.

The programmed microcomputer also includes means for determining whether the control system is operating in a back-up mode and, if not, for causing the generating means 23, 24a, 24b, to generate the control transfer signal repetitively during the predetermined spaced time intervals.

Figure 1A:
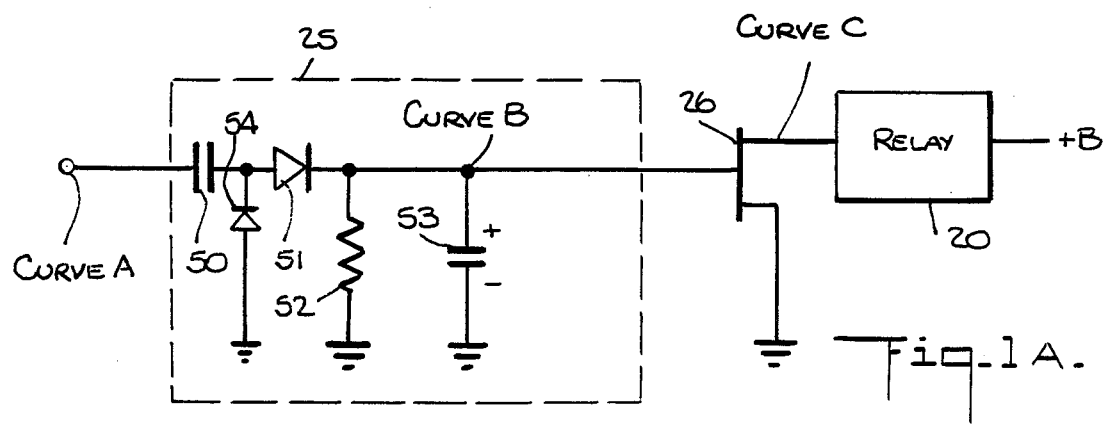
FIG. 1A is a diagram, partly schematic, of a portion of the FIG. 1 control system.

Referring for the moment to FIG. 1A, there is represented a circuit diagram, partly schematic, of the integrator 25, the gate 26 and the control transfer relay 20. The integrator 25 comprises, for example, a series condenser 50 which is sufficiently small that it cannot transfer the energy of each pulse of the control transfer signal applied thereto by the gated pulse driver 24b. A diode 51 is in series with the condenser 50 and a condenser 53 to be charged by the control transfer signal. A clamping diode 54 is coupled between condenser 50 and ground. A resistor 52 provides a long discharge time constant for the condenser 53 which is coupled to the input gate electrode of a field-effect transistor 26 serving as gate 26 is connected to the condenser 53. An output drain electrode of the field-effect transistor 26 is connected to the control transfer relay 20.

Figure 3:
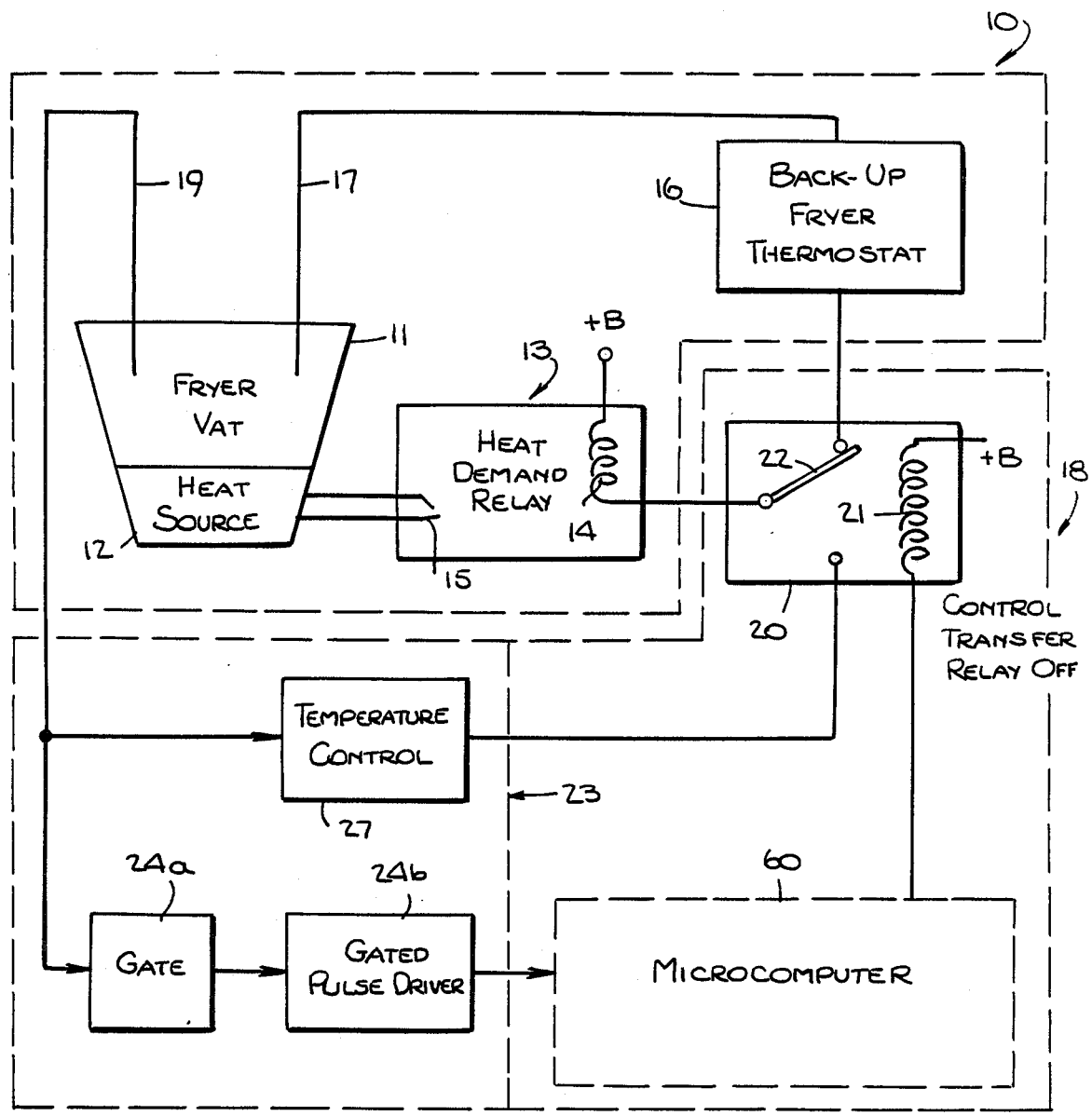
FIG. 3 is a circuit diagram, partly schematic, of another embodiment of a control system conducted in accordance with the invention.

In the FIG. 3 embodiment of the invention, the means responsive to the repetitive control transfer signal includes a programmed microcomputer portion including timer means and in which the control transfer signal resets the timer means for causing the control transfer means 20 to couple the primary thermostat means 23 to the heat control means 12 and in which the timer commences to countdown.

As will be described more fully subsequently, the means comprising a portion of the programmed microcomputer 60 of FIG. 3 and responsive to the repetitive control transfer signal receives a repeated control transfer signal after a predetermined time interval and resets the timer means. When the means comprising a portion of the programmed microcomputer 60 of FIG. 3 and responsive to the repetitive control transfer signal does not receive a repeated control transfer signal after a predetermined time interval, a programmed microprocessor portion including means for determining whether the timer means has counted down to zero is actuated. The means responsive to the absence of the control transfer signal during the predetermined spaced time intervals, if the timer means has counted down to zero, causes the control transfer means 20 to transfer coupling of the heat control means 12 from the primary thermostat means 18 to the back-up thermostat means 16, 17.

Considering now the programmed microcomputer referred to previously in connection with primary thermostat 23 of FIG. 1 with reference to the flow chart of FIG. 4, the programmed microcomputer has a "power on routine" portion 30. The "power on routine" portion is coupled to a "probe failure?" microprocessor portion 31 which determines whether there has been a probe failure. The "no" output of the "probe failure?" microprocessor portion 31 is coupled to a "back-up mode?" microprocessor portion 32. If the control system is not in a back-up mode, the "no" output of the microprocessor portion 32 which is coupled to a "send control transfer signal" microprocessor portion 33 causes the control transfer signal to be sent to the receiver integrator 25 (FIG. 1). The "send control transfer signal" microprocessor portion 33 is coupled to a "normal operating routines" microprocessor portion 34 which causes the microprocessor to perform its programmed normal operating routines. The "normal operating routines" microprocessor portion 34 is, in turn, coupled to the "probe failure?" microprocessor portion 31. The "yes" output of the "probe failure?" microprocessor portion 31 is coupled to a "disable control transfer" microprocessor 35 which is coupled to the input of the "probe failure?" microprocessor portion. The "yes" output of the "back-up mode?" microprocessor portion 32 is also coupled to the "disable control transfer" microprocessor portion 35. The "disable control transfer" portion 35 causes the microprocessor, gate 24a, and gated pulse driver 24b (FIG. 1) to cease to generate the repetitive control transfer signal, as represented in FIG. 2 by Curve A. The corresponding integrated signal applied to the field-effect transistor or gate 26 by the condenser 53 of the integrator 25 is represented by Curve B of FIG. 2. The threshold voltage of the field-effect transistor gate 26 is represented in broken-line construction as line $b_1$. The corresponding energization of the control transfer relay 20 is represented by Curve C of FIG. 2.

Referring now more particularly to FIG. 3 of the drawings, there is represented a control system for cooking apparatus similar to the control system and cooking apparatus of FIG. 1. The same components have been designated by the same numbers as in FIG. 1 and it will be noted that a microcomputer 60 replaces the analog receiver integrator 25 and gate 26 of FIG. 1.

Referring now more particularly to the FIG. 5 microprocessor portion, the microprocessor has a start portion 40 which is coupled to a "receive control transfer signal?" microprocessor portion 41 which determines whether the microprocessor portions, corresponding to the receiver integrator 25 (FIG. 1) and gate 26, and control transfer relay 20 are receiving the appropriate control transfer signals. The "yes" output of the microprocessor portion 41 is coupled to a "reset timer" microprocessor portion 42 which is coupled to an "enable control transfer" microprocessor portion 43, which may be the integrator 25 for pulse train A (FIG. 2) and gate 26 of FIG. 1. The microprocessor portion 43 is coupled to the "receive control transfer signal?" microprocessor portion 41. The "no" output of the "receive control transfer signal" microprocessor portion 41 is coupled to a "decrement timer" portion 44 which is coupled to a "is timer greater than zero?" microprocessor portion 46. The "yes" output of the microprocessor portion 46 is coupled to the "receive control transfer signal?" microprocessor portion 41 so that the control transfer signal is effective during the period between pulses to keep the control transfer relay energized and maintain the control system under the control of the thermostat 18, 19.

When the "is timer greater than zero?" microprocessor portion provides a "no" output, meaning that the timer has counted down to zero and no control transfer signal has been received, the microprocessor portion 46 is effective to load the timer with a hysteresis value at "set timer hysteresis" microprocessor portion 47 and to actuate the "disable control transfer" microprocessor portion 48 which is coupled to the input of the "receive control transfer signal?" microprocessor portion 41.

From the foregoing description, it will be apparent that if the control transfer signal line from the primary thermostat 23 to the receiver integrator 25 becomes shorted to ground through a wire fault or if the primary thermostat 23 turns the heat on in the heat source 12 and then fails due to a software failure, no control transfer signal will be applied to the control transfer relay 20 as, for example, at time $t_1$ represented in FIG. 2. The control transfer relay 20 then returns to its unactuated condition represented in the drawing, transferring temperature control to the back-up thermostat 16.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A control system for cooking apparatus including a heat source, heat control means, back-up thermostat means having a back-up temperature probe, the control system comprising:
    control transfer means;
    primary thermostat means including a primary temperature probe and coupled through said control transfer means to the heat control means for controlling the temperature of the cooking apparatus;
    means for generating a control transfer signal repetitively during predetermined spaced time intervals in the course of normal operation and responsive to a failure of said primary thermostat means for ceasing to generate said control transfer signal repetitively;
    means responsive to said repetitive control transfer signal for causing said control transfer means to couple said primary thermostat means to said heat control means for controlling the temperature of the cooking apparatus and responsive to the absence of said control transfer signal during said predetermined spaced time intervals for causing said control transfer means to transfer coupling of the heat control means from said primary thermostat means to the back-up thermostat means for controlling the temperature of the cooking apparatus in the event of a failure of said primary thermostat means.

2. A control system in accordance with claim 1, in which said means responsive to the absence of said control transfer signal includes means for determining when a failure occurs in said primary thermostat means for causing said control transfer means to transfer coupling of the heat control means from said primary thermostat means to the back-up thermostat means.

3. A control system in accordance with claim 1, which includes means for determining whether the control system is operating in a back-up mode and, if not, for causing said generating means to generate said control transfer signal repetitively during said predetermined spaced time intervals.

4. A control system in accordance with claim 1, in which said means responsive to said repetitive control transfer signal includes an integrator for said control transfer signal and a gate coupled to said integrator for causing said control transfer means to couple said primary thermostat means to said heat control means for controlling the temperature of the cooking apparatus.

5. A control system in accordance with claim 1, in which said means responsive to said repetitive control transfer signal includes timer means and in which said control transfer signal resets said timer means for causing said control transfer means to couple said primary thermostat means to the heat control means, and in which said timer commences to count down.

6. A control system in accordance with claim 5, in which said means responsive to said repetitive control transfer signal receives a repeated control transfer signal after a predetermined time interval and resets said timer means.

7. A control system in accordance with claim 5, in which said means responsive to said repetitive control transfer signal does not receive a repeated control transfer signal after a predetermined time interval and which includes means for determining whether said timer means has counted down to zero and in which said means responsive to the absence of said control transfer signal during said predetermined spaced time intervals, if said timer means has counted down to zero, causes said control transfer means to transfer coupling of the heat control means from said primary thermostat means to the back-up thermostat means.

* * * * *